(12) United States Patent
Robinson et al.

(10) Patent No.: US 11,099,392 B2
(45) Date of Patent: Aug. 24, 2021

(54) STABILIZED AND TRACKED ENHANCED REALITY IMAGES

(71) Applicant: Hewlett-Packard Development Company, L.P., Spring, TX (US)

(72) Inventors: Ian N Robinson, Palo Alto, CA (US); Robert Paul Martin, Fort Collins, CO (US); Nathan Barr Nuber, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/618,569

(22) PCT Filed: Oct. 18, 2017

(86) PCT No.: PCT/US2017/057091
§ 371 (c)(1),
(2) Date: Dec. 2, 2019

(87) PCT Pub. No.: WO2019/078833
PCT Pub. Date: Apr. 25, 2019

(65) Prior Publication Data
US 2020/0241300 A1 Jul. 30, 2020

(51) Int. Cl.
*G02B 27/01* (2006.01)
*G06T 7/73* (2017.01)
(Continued)

(52) U.S. Cl.
CPC ..... *G02B 27/0172* (2013.01); *G02B 27/0093* (2013.01); *G02B 27/0101* (2013.01);
(Continued)

(58) Field of Classification Search
CPC .............. G02B 27/0093; G02B 27/017; G02B 2027/0138; G02B 2027/0187; G06F 1/163; G06F 3/011; G06F 3/0304
See application file for complete search history.

(56) References Cited

U.S. PATENT DOCUMENTS 9,332,285 B1 * 5/2016 Grant ............... H04N 21/47205
9,749,535 B1 8/2017 Hatao et al.
(Continued)

FOREIGN PATENT DOCUMENTS

| WO | WO-9957900 A1 | 11/1999 |
| WO | WO-2017172528 A1 | 10/2017 |
| WO | WO-2017172984 A2 | 10/2017 |

OTHER PUBLICATIONS

Dove, J., Lucidcam Review: Stereoscopic 3D VR Creation Comes to the Masses. Aug. 15, 2017, https://www.macworld.com/article/3215136/virtual-reality/lucidcam-review-stereoscopic-3d-vr-creation-comes-to-the-masses.html.
(Continued)

*Primary Examiner* — Nelson M Rosario
(74) *Attorney, Agent, or Firm* — Fabian VanCott (57) ABSTRACT

An enhanced reality system includes, in an example, a processor, an enhanced reality display to present, via execution of the processor, a view of an enhanced reality environment to a first user, a display device to present to at least a second user, via execution of the processor, a stabilized tracked view of the enhanced reality environment presented to the first user wherein the view of the enhanced environment provided by the display device is provided using a camera.

20 Claims, 4 Drawing Sheets

(51) Int. Cl.
*G02B 27/00* (2006.01)
*G06F 3/01* (2006.01)
*G06F 3/03* (2006.01)
*G06F 3/0346* (2013.01)

(52) U.S. Cl.
CPC ............ *G06F 3/011* (2013.01); *G06F 3/0304* (2013.01); *G06F 3/0346* (2013.01); *G06T 7/74* (2017.01); *G02B 2027/0138* (2013.01); *G02B 2027/0187* (2013.01); *G06T 2207/30244* (2013.01)

(56) References Cited

U.S. PATENT DOCUMENTS

| | | | |
|---|---|---|---|
| 2015/0348327 A1* | 12/2015 | Zalewski | ................ G06T 15/00 345/419 |
| 2016/0327950 A1 | 11/2016 | Bachrach et al. | |
| 2017/0132845 A1* | 5/2017 | Everman, II | ............ G06F 3/017 |
| 2017/0168566 A1 | 6/2017 | Osterhout et al. | |
| 2018/0095635 A1* | 4/2018 | Valdivia | ................ G06F 3/0482 |
| 2018/0232928 A1* | 8/2018 | Grant | ...................... G06F 3/013 |

OTHER PUBLICATIONS

Komiyama. R. et al., "JackIn space: designing a seamless transition between first and third person view for effective telepresence collaborations." In Proceedings of the 8th Augmented Human International Conference,p. 14. ACM, 2017.

Maeda, T. et al., "Immersive telecollaboration with Parasitic Humanoid: how to assist behavior directly in mutual telepresence." ICAT, 2011.

T. Lee, et al., "Viewpoint stabilization for live collaborative video augmentations." In 2006 IEEE/ACM International Symposium on Mixed and Augmented Reality, pp. 241-242. IEEE, 2006.

* cited by examiner

STABILIZED AND TRACKED ENHANCED REALITY IMAGES

BACKGROUND

Augmented reality, virtual reality, and mixed reality all involve users interacting with real and/or perceived aspects of an environment in order to manipulate and/or interact with that environment. Interaction by a user in the augmented reality, virtual reality, and/or mixed reality environments may be viewed by others via a display device communicatively coupled to an augmented reality, virtual reality, and/or mixed reality system.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Virtual reality (VR), augmented reality (AR), and mixed reality (MR) systems and devices are used by a user to perceive a visual representation of a VR, AR, and/or MR environments. VR systems and devices implement virtual reality (VR) headsets to generate realistic images, sounds, and other human discernable sensations that simulate a user's physical presence in a virtual environment presented at the headset. In some examples, the VR system and/or device includes physical spaces and/or multi-projected environments. AR systems and devices may include those systems and devices that implement live direct and/or indirect view of a physical, real-world environment whose elements are augmented by computer-generated sensory input such as sound, video, graphics and/or GPS data. MR systems and devices include the merging of real and virtual worlds to produce new environments and visualizations where physical and digital objects co-exist and interact in real time. For simplicity in description only, a virtual reality (VR), augmented reality (AR), and mixed reality (MR) systems and devices are referred to herein as enhanced reality (ER) systems and/or devices.

During use of these ER system and/or devices, viewers other than the user wearing the ER headset may be allowed to view the ER environment a user implementing the ER system is experiencing. The viewers may view the experience via a display device communicatively coupled to the ER system. Thus, any number of viewers may be involved in the experience and may participate in the operation and enjoyment of the ER system and devices. However, during use of the ER systems viewers viewing the ER experience on a display device may fail to appreciate what the user, immersed in the ER environment, is experiencing. While a copy of what the user is currently seeing through their headset may be displayed on the display device attached to, for example, a personal computer (PC) executing computer usable program code embodied as an ER application, a first-person view shifts with every small head motion of the user, rendering the resulting video experience difficult to watch and appreciate. Seeing whats in the user's immediate focus of attention may also deprive viewers of the context in which actions engaged in by the user are taking place. This limits the ability of an ER system user to communicate design issues, do customer walkthroughs, and conduct training, among other actions.

The present specification describes an enhanced reality system that includes a processor, an enhanced reality display to present, via execution of the processor, a view of an enhanced reality environment to a first user, a display device to present to at least a second user, via execution of the processor, a stabilized tracked view of the enhanced reality environment presented to the first user wherein the view of the enhanced environment provided by the display device is provided using a camera. In an example, the camera is a virtual camera. In an example, the camera includes a physical camera.

The present specification also describes a method that includes, with a processor, tracking a physical location and orientation of an enhanced reality headset worn by a first user, the enhanced reality headset presenting a view of a location within an enhanced reality environment, setting a location within the enhanced reality environment describing a location of a camera, the camera to present a view of the location within the enhanced reality environment presented by the enhanced reality headset, stabilizing an image to be presented by the camera; and providing the stabilized image to a display device with the camera.

The present specification further describes a computer program product for viewing an enhanced reality experience the computer program product that includes a computer readable storage medium comprising computer usable program code embodied therewith, the computer usable program code to, when executed by a processor track a physical location and orientation of an enhanced reality headset worn by a first user, the enhanced reality headset presenting a view of a location within an enhanced reality environment, set a location within the enhanced reality environment describing a location of a camera, the camera to present a view of the location within the enhanced reality environment presented by the enhanced reality headset, stabilize an image of the camera, and provide the stabilized image to a display device with the camera.

As used in the present specification and in the appended claims, the term "enhanced reality (ER)" is meant to be understood as a reality that has been enhanced via, for example, a virtual reality system or device, an augmented reality system or device, and/or a mixed reality system or device.

Figure 1:
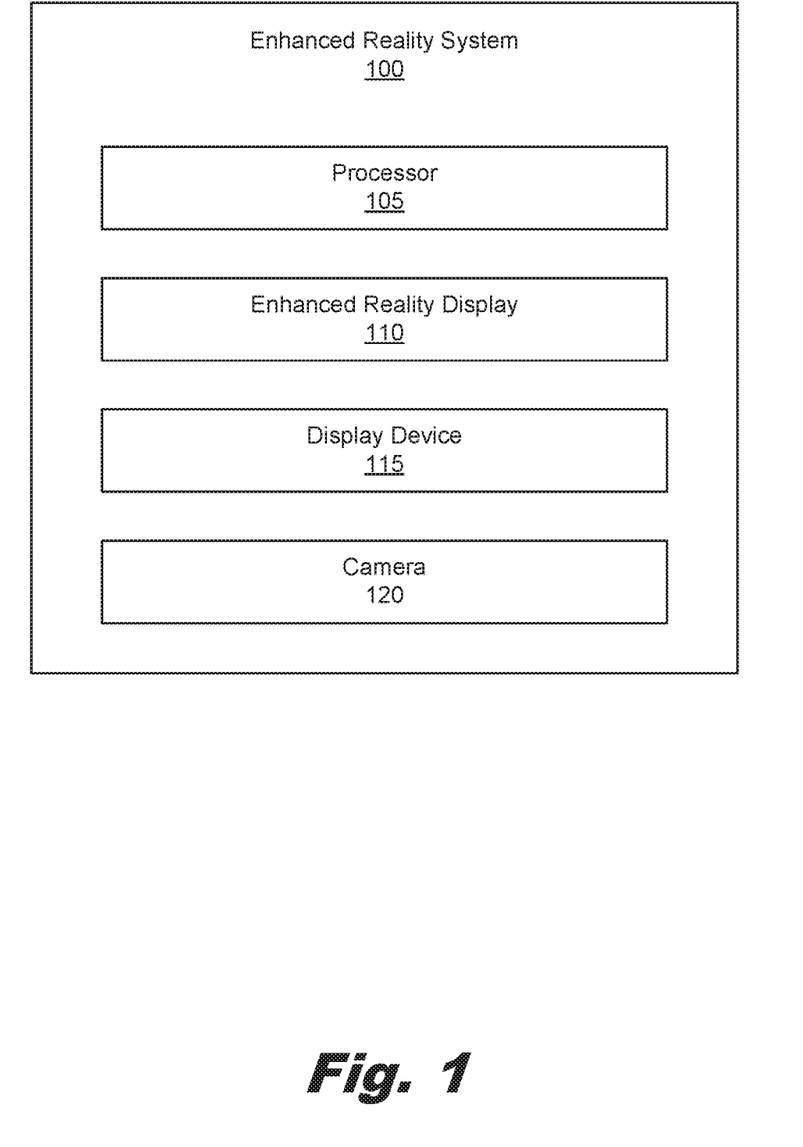
FIG. 1 is a block diagram of an enhanced reality system according to an example of the principles described herein.

Turning now to the figures, FIG. 1 is a block diagram of an enhanced reality system (100) according to an example of the principles described herein. The enhanced reality system (100) may include a processor (105), an enhanced reality display (110), a display device (115), and a camera (120).

The enhanced reality system (100) may be implemented in connection with an electronic device. Examples of electronic devices include servers, desktop computers, laptop computers, personal digital assistants (PDAs), mobile devices, smartphones, gaming systems, and tablets, among other electronic devices. The enhanced reality system (100), in an example, may further include an enhanced reality headset meant to be worn by a first user of the enhanced reality system (100). The enhanced reality headset may be communicatively coupled to an electronic device such that execution of computer readable program code by a processor associated with the electronic device causes a view of an enhanced reality environment to be displayed on the enhanced reality headset.

The enhanced reality system (100) may be utilized in any data processing scenario including, stand-alone hardware, mobile applications, through a computing network, or combinations thereof. Further, the enhanced reality system (100) may be used in a computing network, a public cloud network, a private cloud network, a hybrid cloud network, other forms of networks, or combinations thereof. The present systems may be implemented on one or multiple hardware platforms, in which executed computer readable program code associated with the system can be executed on one or across multiple platforms. Such computer readable program code may run on various forms of cloud technologies and hybrid cloud technologies and can be implemented on or off the cloud. In another example, the methods provided by the enhanced reality system (100) are executed by a local administrator.

To achieve its desired functionality, the enhanced reality system (100) may include various hardware components. Among these hardware components may be a number of processors (105), a number of data storage devices, a number of peripheral device adapters such as the enhanced reality headset, and a number of network adapters. These hardware components may be interconnected through the use of a number of busses and/or network connections. In one example, the processor (105), data storage device, peripheral device adapters, and a network adapter may be communicatively coupled via a bus.

The processor (105) may include the hardware architecture to retrieve executable code from the data storage device and execute the executable code. The executable code may, when executed by the processor (105), cause the processor (105) to implement at least the functionality of tracking a physical location and orientation of an enhanced reality headset worn by a first user, the enhanced reality headset presenting a view of a location within an enhanced reality environment, setting a location within the enhanced reality environment describing a location of a camera, the camera to present a view of the location within the enhanced reality environment presented by the enhanced reality headset, stabilizing an image to be presented by the camera, and providing the stabilized image to a display device with the camera according to the methods of the present specification described herein. In the course of executing code, the processor (105) may receive input from and provide output to a number of the remaining hardware units.

The data storage device may store data such as executable program code that is executed by the processor (105) or other processing device. As will be discussed, the data storage device may specifically store computer code representing a number of applications that the processor (105) executes to implement at least the functionality described herein.

The data storage device may include various types of memory modules, including volatile and nonvolatile memory. For example, the data storage device of the present examples may include Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs. For example, in certain examples the processor (105) may boot from Read Only Memory (ROM), maintain nonvolatile storage in the Hard Disk Drive (HDD) memory, and execute program code stored in Random Access Memory (RAM).

Generally, the data storage device may comprise a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters in the enhanced reality system (100) enable the processor (105) to interface with various other hardware elements, external and internal to the enhanced reality system (100). For example, the peripheral device adapters may provide an interface to input/output devices, such as, for example, display device (115), a mouse, or a keyboard and the enhanced reality headset. The peripheral device adapters may also provide access to other external devices such as an external storage device, a number of network devices such as, for example, servers, switches, and routers, client devices, other types of computing devices, and combinations thereof.

The display device (115) may be provided to allow at least a second user of the enhanced reality system (100) to, at least, view a stabilized tracked view of the enhanced reality environment presented to the first user at the enhanced reality headset. The peripheral device adapters may also create an interface between the processor (105) and the display device (115), a printer, or other media output devices. The network adapter may provide an interface to other computing devices within, for example, a network, thereby enabling the transmission of data between the enhanced reality system (100) and other devices located within the network.

The enhanced reality system (100) may further include a number of modules defined by computer usable program code that is used in the implementation of the functionality described herein. The various modules within the enhanced reality system (100) comprise executable program code that may be executed separately. In this example, the various modules may be stored as separate computer program products. In another example, the various modules within the enhanced reality system (100) may be combined within a number of computer program products; each computer program product comprising a number of the modules.

The enhanced reality display (110) may be, in an example, an enhanced reality headset. In this example, the enhanced reality headset may be fitted to the head of a user such that a user may view an enhanced reality environment at a display provided within the enhanced reality headset. In this example, the enhanced reality headset implements a stereoscopic head-mounted display that provides separate images for each eye of the user. In some examples, the enhanced reality headset may provide stereo sound to the user. In an example, the enhanced reality headset may include a head motion tracking sensor that includes a gyroscope and/or an accelerometer. In an example, the enhanced reality headset may include an eye tracking sensor to track the eye movement of the user of the headset. Although the present examples describe an enhanced reality headset used by a first user, the present specification contemplates other types of visual devices for the first user to interact within an enhanced reality environment.

The enhanced reality system (100) may further include a display device (115) that presents to at least a second user a stabilized and tracked view of the enhanced reality environment presented to the first user of the enhanced reality display (110). The display device (115) presents a view within the enhanced reality environment as generated by the camera (120). In some examples, the view of the enhanced reality environment presented on the display device (115) by the camera (120) may be based, at least partially, on the location and orientation of the enhanced reality display (110) (i.e., the enhanced reality headset). In this example, tracking information regarding the location and orientation of the enhanced reality display (110) may indicate a position within the enhanced reality environment that the first user is viewing. It may be this point within the enhanced reality environment where the camera (120) also is directed to provide a view and the camera (120) provides such a view. Thus, the second user viewing the display device (115) may see what the first user is seeing in the enhanced reality display (110) (i.e., the enhanced reality headset).

In an example, the camera (120) is one of a virtual camera virtually situated within the enhanced reality environment at a predetermined location. In an example the virtual camera (120) may be positioned relative to the tracked location of part of the first users body, for example their head or torso. In an example, the virtual camera (120) may be associated with a physical camera attached to part of the first user's body, for example their head or torso. In some examples a camera viewpoint located over a shoulder of the first user implementing the enhanced reality display (110) provides an informative view of the first user's actions in the virtual environment. Furthermore, by having the camera location follow the first user's upper torso, the view presented to the second user of the display device (115) is not directly impacted by the natural head motions performed by the first user as they look around the virtual environment. For ease of understanding the present specification will describe the virtual camera as being placed virtually over the shoulder of the first user.

In an example, the direction of a default view may be slaved to the view direction of the enhanced reality display (110) used by the first user. In this example, the images as seen by the first user of the enhanced reality display (110) will be seen by the second user of the display device (115) albeit, in an example, slightly off-set from the location and/or orientation of the enhanced reality display (110). The processor (105) may, in an example, receive input as to the position and orientation of the enhanced reality display (110), calculate a view seen by the first user, and recalculate an originating position of the virtual camera such that the view may be presented on the display device (115). In the case where the camera position is slaved to the user's upper torso, the system uses information describing the position and orientation of that body part. Some enhanced reality systems do not provide this directly so, for example, an additional tracking sensor attached to the user's upper torso may be implemented. In an example, the processor (105) may select a position within the enhanced reality environment and recalculate a view based on that position. In an example, the recalculated view of the virtual camera may, as a default view, target the same location in the enhanced reality environment as that of the view presented to the first user of the enhanced reality display (110) (i.e., enhanced reality headset).

In an example, the second user of the display device (115) may be provided with an input device to control the view point of the camera (120) and therefore what is presented on the display device (115). Some examples of input devices may include a mouse, a joystick, a motion controller, or combinations thereof. With these input devices, the second user may override the default camera view as described herein and explore, visually, the enhanced reality environment unrestricted from where the first user implementing the enhanced reality display (110) is viewing. Again, the processor (120) may recalculate the origination position of the virtual camera and accordingly provide the recalculated view to the display device (115). As mentioned above, at least one of the input devices may allow the second user to select different location with the enhanced reality environment where the virtual camera is to be placed. Changing the position of the virtual camera within the enhanced reality environment implements a recalculation process according to the principles described herein. The enhanced reality system (100) may provide a visual indication on the display device (115) of the current view direction of the first user, or implement some other processes and/or devices by which the viewer of the display device (115) can rejoin with the first user's view. In addition, the enhanced reality system (100) may generate an avatar for the first user's headset to provide additional context for the viewer of the display device (115).

In the example where the enhanced reality display (110) includes an eye gaze sensor, the default view presented to the second user at the display device (115) via the virtual camera may be dependent, not on the position and orientation of the enhanced reality display (110), but instead on the direction of the first user's eyes. In this example, the orientation and position of the enhanced reality display (110) may be directed to one location within the enhanced reality environment while the gaze of the first user is at a different location within the enhanced reality environment. Again, in an example, the second user may implement input devices to direct the view of the virtual camera regardless of the direction of gaze of the first user.

Figure 2A:
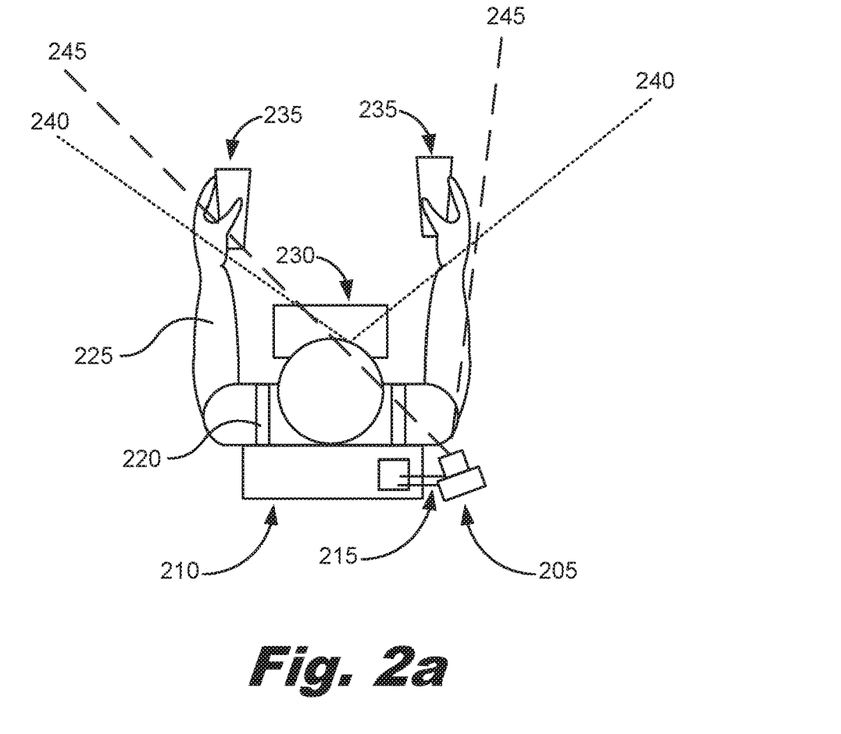
FIG. 2a is a top view of the enhanced reality system incorporating a physical camera according to an example of the principles described herein.
Figure 2B:
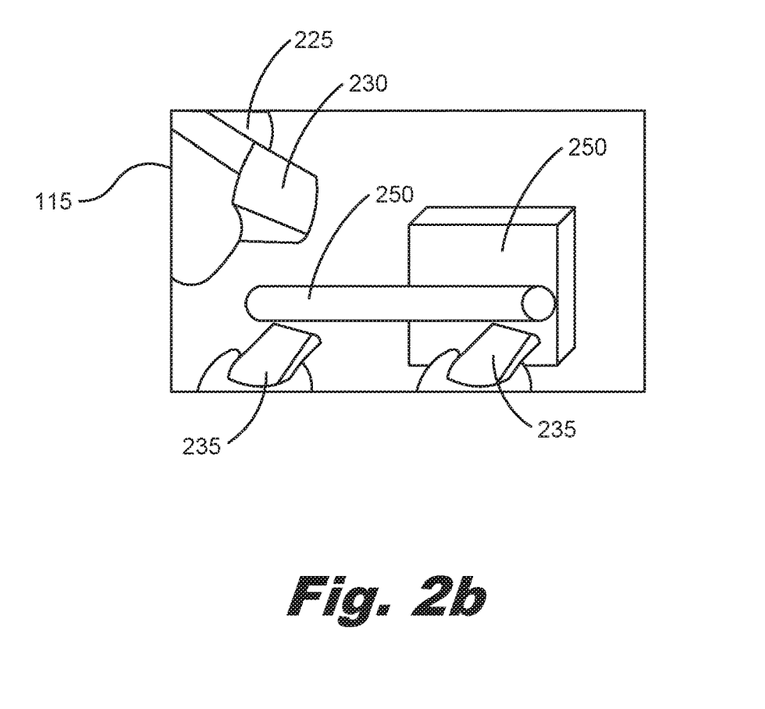
FIG. 2b is a view on the display device as presented by combining views from the virtual camera and the physical camera shown in FIG. 2a according to an example of the principles described herein.

As mentioned above, the camera (120) may be associated with a physical camera attached to the first user's (225) body. In order to obtain a view over the first user's (225) shoulder, the physical camera may be coupled to, for example, a backpack (210) worn by the first user (225). FIG. 2a is a top view of the enhanced reality system (100) incorporating a physical camera (205) according to an example of the principles described herein. FIG. 2b is a view on the display device (FIG. 1, 115) as presented by combining the views from the virtual camera (120) and the physical camera (205) shown in FIG. 2a according to an example of the principles described herein. The backpack (210) includes the physical camera (205) extending therefrom via a support system (215) that allows the camera to be positioned over a shoulder of a first user (225). The backpack (210) may further include a number of straps (220) that couple the backpack (210) to the user (225). An enhanced reality headset (230) may be strapped to the user's (225) head and the user (225) may hold a number of enhanced reality manipulation devices (235) in order to manipulate virtual objects within the enhanced reality environment. In an example where the backpack (210) is not present, the physical camera (205) may include a shoulder mount to be coupled to the user's (225) shoulder during use. In an example, the physical camera (205) may be electrically and communicatively coupled to the user's (225) enhanced reality headset (230) in order to receive and communicate with the enhanced reality system (100) generally. In an example, the physical camera (205) may be wirelessly coupled to a processor (FIG. 1, 105) of the enhanced reality system (100) in order to have the processor (105) process the image data as descried herein.

As can be seen, the enhanced reality headset (230) may have a first field of view as indicated by a first cone (240). The physical camera (205) may have its own field of view as indicated by a second cone (245). A representation of the second field of view represented by the second cone (245) is shown in FIG. 2b. As can be seen, the combination of a virtual camera (120) and physical camera (205) may present to a display device (115) a view that includes both real and virtual objects. The real objects may include the user's (225) head and hands as well as the enhanced reality manipulation devices (235) used by the user (225). The virtual objects (250) may be presented using data presented to the user (225) through the enhanced reality headset (230). In this example with the physical camera (205), therefore, the image presented on the display device (115) viewed by a second user is similar to an augmented reality view as described herein. In contrast, where only a virtual camera (120) is used, the image presented on the display device (115) may be more similar to a virtual reality view as describe herein.

Similar to the virtual camera, a second user viewing the display device (115) may be provided with an input device that the second user may use to change the view direction of the combined virtual and physical camera (205). Again, a default view may be a view direction of the first user implementing the enhanced reality headset (230) and a second user may choose to manipulate the view direction of the physical camera (205) if the view is to be changed. Changing the view direction may be achieved by mechanically rotating the physical camera (205), or by using a wider field of view (245) of the physical camera (205) and electronically cropping the resulting image to frame the desired area. As the virtual camera location is coupled to the body-worn physical camera (205), it may be less practical to change the camera location (as was possible with only a virtual camera). Further, an eye gaze sensor may be used to track the first user's (225) eyes in order to set a default view of the physical camera (205).

In an example, the display device (115) may also be physically coupled to the backpack (210). In this example, the display device (115) may show the enhanced reality environment as if looking through the physical body of the user (225). Alternatively, the display device (115) may be physically disconnected from the backpack (210) but communicatively coupled to the processor (105) or a processor such that the physical camera (205) can send the image data to the display device (115).

In the example shown in FIG. 2a, the backpack (210) may include, at least, the processor (105) described in connection with FIG. 1. In this example, the processor may execute computer readable program code that presents an enhanced reality environment to the first user (225) via the enhanced reality headset (230). In an example, the processor (105) on the backpack (210) may also process the image to be shown on the display device (115). Alternatively, a separate computing device communicatively coupled to the enhanced reality system (FIG. 1, 100) and/or backpack (210) may provide the processing power used to generate the images to be presented on the display device (115).

The processor (105) may further conduct a stabilization process to stabilize the images presented on the display device (115). As mentioned herein, a user (225) of the enhanced reality headset (230) may move his or her head fast or erratically enough to render an image of the enhanced reality environment at the display device (115) that is blurry, unrecognizable, or otherwise disorienting to a viewer of the display device (115). In an example where the camera view is slaved to the first user's (225) view direction, the processor (105) may stabilize such an image by smoothing out the trajectory of the virtual camera and, if present, the image produced by the physical camera (205), in order to ameliorate any sudden transitions and jerkiness in the images presented. If present, changes in the physical camera's (205) view direction, as determined by the smoothing process, may be realized by the techniques described earlier in which the physical camera (205) has a significantly wider field of view (245) than is required for the final image. The stabilized view direction may then be selected from within the images captured.

In an example, a low-pass filter may be used to smooth out the image presented. Additionally, where a virtual camera or physical camera (205) are given a target direction based on either the default view or user selected view, the enhanced reality system (100) may adjust the yaw, pitch and roll of the view presented. In an example, a low-pass filter may be applied to changes in these components. Different weights may be applied to the filters on each of these components. In an example, a rate of change in the yaw may be limited in order to avoid fast panning across views of the enhanced reality environment. In an example, the rate of pitch may also be limited with the limitation of rate being relatively greater for the rate of pitch than the rate of yaw. This may be done because up and down camera motions (pitch) are conducted by a first user (225) relatively less often than side to side motions (yaw). In addition, constraints may be imposed on the range of allowed values for these components in order to enhance the viewing experience and reduce disorientation. In an example, the roll of the image may be constrained to 0 degrees (horizontal) so that the view presented to the second user at the display device (115) is always level. Using these image stabilization techniques, a second user may view the smoothed images presented on the display device (115) without feelings of disorientation or otherwise not appreciating what is being seen on the display device (115).

In the examples presented herein, the first user (225) may use the enhanced reality headset (230) to see within the enhanced reality environment as well as interact with real and/or virtual object therein. In so doing, the user (225) is allowed to interact with the virtual camera (120) or a combination of physical camera (205) and virtual camera (120). In an example, the user (225) is presented with an avatar representing the physical location of the virtual camera (120) within the enhanced reality environment. The avatar of the virtual camera (120) may be generated by relaying location data of the virtual camera (120) to the enhanced reality system (100). Additionally, a visual representation of the current view direction of the virtual camera (120) such as the field of view as indicated by a second cone (245) may be presented to the first user (225). Audio may also be relayed to the second user viewing the display device (115) such that the first user (225) may direct the second user, via a number of input devices, to change the view angle of the virtual camera (120). Additionally, where the first user (225) is made aware of the view angle of the virtual camera (120), the first user (225) and second user may converse about what is being seen within each other's views.

Figure 3:
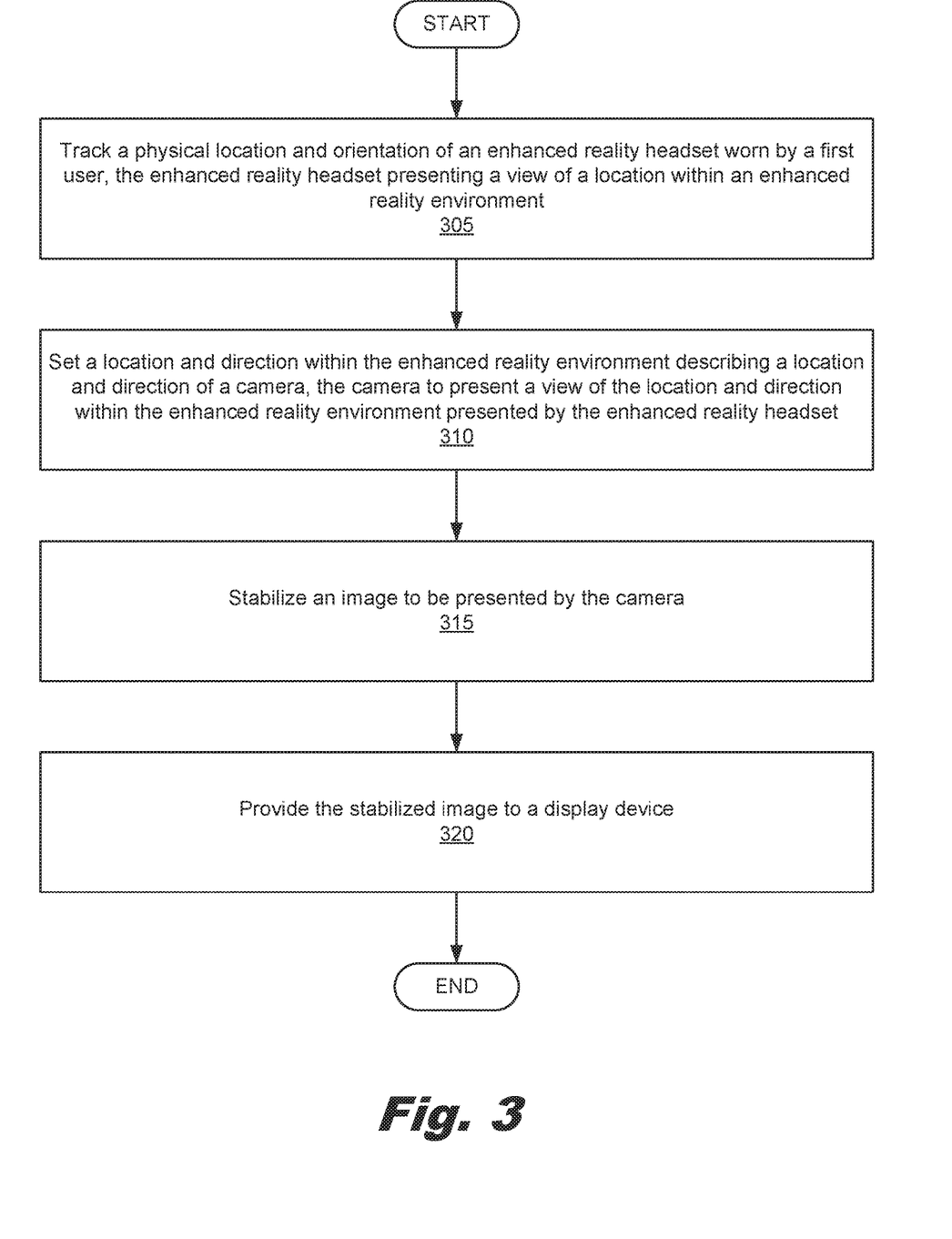
FIG. 3 is a flowchart showing a method of providing an image of an enhanced reality environment to a viewer of the display device of FIG. 1 according to an example of the principles described herein.

FIG. 3 is a flowchart showing a method (300) of providing an image of an enhanced reality environment to a viewer of the display device of FIG. 1 according to an example of the principles described herein. The method (300) may begin with tracking (305) a physical location and orientation of an enhanced reality headset (230) worn by a first user (225), the enhanced reality headset (230) presenting a view of a location within an enhanced reality environment. As described above, the tracking (305) may be accomplished through the use of a number of accelerometers and/or gyroscopes and/or optical sensors associated with the enhanced reality headset (230). With this information, the enhanced reality system (100), via the processor (105), may present a view within the enhanced reality environment to the enhanced reality headset (230) accordingly.

The method (300) may continue with setting (310) a location and direction within the enhanced reality environment describing a location and direction of a camera, the camera to present at least one view of the location and direction within the enhanced reality environment presented by the enhanced reality headset (230). As described herein, the target view of the camera may be defaulted to the target view of the enhanced reality headset (230) using the processor (105). However, in some examples, a second user may implement certain input devices to change the default view direction of the camera and, therefore, may view a location within the enhanced reality environment different from that location viewed by the first user (225).

In these examples, the method (300) may continue with stabilizing (315) an image to be presented by the camera using the processor (105). As described above, stabilization (315) of the image to be presented on the display device (115) by the virtual camera and, if present, the physical camera (205) may include smoothing out the trajectory of the camera using, for example, a low-pass filter. This eliminates the jerkiness in the virtual camera or physical camera (205) view allowing a second user to discern what is being presented on the display device (115) without becoming disoriented. Certain orientations of the video presented may also be restricted. In some examples, the virtual or real roll of the virtual camera or physical camera (205), respectively, may be disabled such that the image remains horizontal at all times. Additionally, the rate of the yaw may be limited in order to avoid fast panning across the scene within the enhanced reality environment. This may prevent the disorientation of the second user viewing the images presented on the display device (115). Further, in some examples, the rate of pitch may also be more limited relative to the yaw due to a pitch maneuver view within the enhanced reality environment being less usual than a yaw maneuver.

The method (300) may continue with providing (320) the stabilized image to the display device (115) using the virtual camera or physical camera (205). As descried herein, any processor (105) may stabilize (315) the image and provide (320) to the display device (115). In an example, the enhanced reality system (100) includes two processors (105); one processor to generate and provide image data to the enhanced reality headset (230) and another processor to generate and provide image data to the display device (115). In this example, the workload of the stabilization (315) and provision (320) of the image data is not put on a single processor. This may be done especially where a second user implements the input devices and is to be presented with a view within the enhanced reality environment that is substantially different from that presented to the first user implementing the enhanced reality headset (230).

As described herein, the display device (115) to which the stabilized image is provided (320) may be provided to any type of display device (115) at any location. Further, at any point in the method (300) data describing an image of the enhanced reality environment may be sent via wire or wirelessly to a second processor associated with the display device (115) for that processor to conduct the functionality as described herein. The display device (115) may, in an example, be a remote monitor apart from the backpack (210) and/or enhanced reality display (FIG. 1, 110). In another example, the display device (115) may be a screen mounted to a portion of the backpack (210) such as at the shoulder location thereby appearing to a second user as if seeing through the backpack and shoulder of the first user (225). Where multiple processors are used, these processors may communicate with each other providing, at least, data describing the position and orientation of the enhanced reality headset (230) and virtual camera or physical camera (205).

The method (300) may, in some examples, include a further process that determines if the virtual camera or physical camera (205) view is to be set to the default view or to a second user-initiated view. As described, the default view is a view of the same location within the enhanced reality environment where, according to its position and orientation, the enhanced reality headset (230) is viewing. In an example, data received from an eye gaze sensor (when implemented) may modify the view direction reported by the enhanced reality headset (230) and the default view location will be set to the gaze of the first user's (225) eye. The processor (105) may detect if and when input devices used by the second user are directing a different view for the display device (115) and will move according to that input from the input devices.

Figure 4:
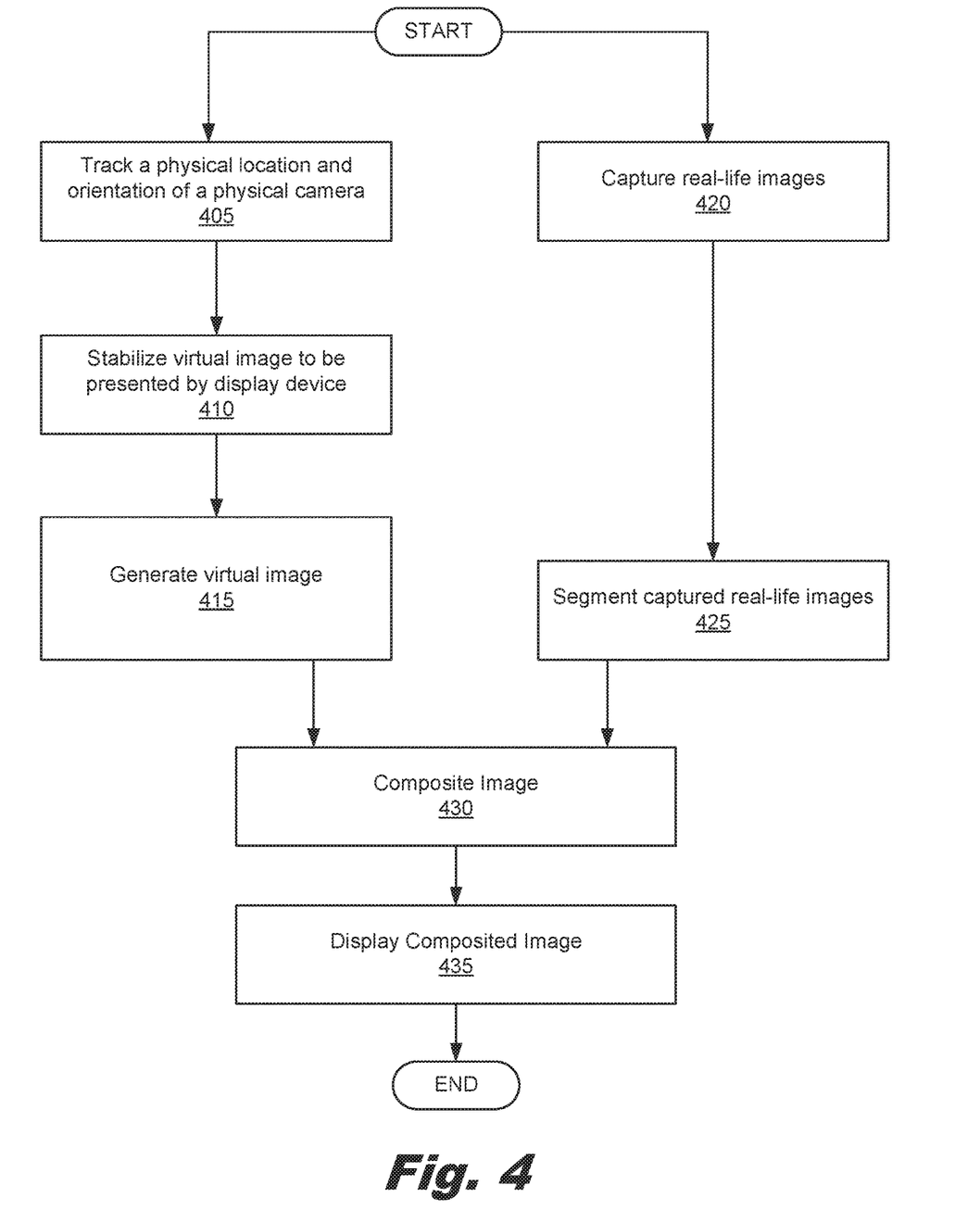
FIG. 4 is a flowchart showing a method of providing an image of an enhanced reality environment to a viewer of the display device of FIG. 1 according to an example of the principles described herein.

In the example where a physical camera (205) is used as an additional video/audio source for the display device (115), the method may include a number of additional processes. FIG. 4 is a flowchart showing another method (400) of providing an image of an enhanced reality environment to a viewer of the display device (115) of FIG. 1 according to an example of the principles described herein. The method (400) may include tracking (405) a physical location and orientation of the physical camera (205). Similar to the enhanced reality headset (230), the physical camera (205) may also include a tracking sensor that may include gyroscopes and/or accelerometers to provide data regarding the physical location and orientation of the physical camera (205). In an example, this data may be provided to either a processor on the backpack (210) or a processor associated with the display device (115).

Tracking (405) may, in an example, include the use of a gyroscope, accelerometer, and/or other tracking devices located on the backpack (210). A predetermined offset based on the physical length of the support structure of the physical camera (205) may provide for the location and/or orientation information for tracking (405) the physical camera (205). Alternatively, the orientation of the backpack (210) relative to the enhanced reality headset (230) may be used along with the offset to provide the location and/or orientation information for tracking (405) the physical camera (205).

In an example, identifying features of the enhanced reality headset (230) and/or enhanced reality manipulation devices (235) held by the first user (225) may be tracked by the physical camera (205). The locations of those identifying feature may be used to estimate the relative position of the physical camera (205) to the enhanced reality headset (230). This process may be simplified by implementing the fact that the range of possible relative positions and orientations of a human body is limited by the musculoskeletal system of especially, the human neck and head. Given the position and/or orientation of the enhanced reality headset (230), and the relative position and/or orientation of the physical camera (205) to the enhanced reality headset (230), the position and/or orientation of the physical camera (205) may be determined. Similarly, using the know limitations of human joints as well as often-used poses of a human, when presented with the first user's (225) torso orientation and position/orientation of the enhanced reality manipulation devices (235), the position and/or orientation of the physical camera (205) may be determined.

Similar to the processes described herein, the virtual images to be presented by the display device (115) may be stabilized (410). Stabilization includes, at least, smoothing the camera trajectory using a low-pass filter as well as adjusting the roll, pitch, and/or yaw variables as described herein. After the stabilization (410) process is complete, a virtual image may be generated (415). A processor (105) may maintain that image for further image generation at the display device (115).

Because the camera in this example includes a physical camera (205), the physical camera (205) may view real life images. The method (400), therefore, includes capturing (420) real life images. The physical camera (205) may capture images of the first user (225) and specifically the first user's (225) head, arms, and/or other body parts. The capture (420) of real-life images may, in an example, occur simultaneously with tracking (405) the physical location of the physical camera (205), stabilizing (410) the virtual images, and generating the virtual image based on the tracking and stabilizing data.

In an example, the physical camera (205) may have a wider field of view than that presented to the first user (225) of the enhanced reality headset (230). This allows the processor (105) of the enhanced reality system (100) to select a portion of the captured (420) real-life images based on the stabilized (410) virtual imagery. In some examples, additional physical cameras (205) may be used with the enhanced reality system (100) choosing an optimal view from one of the physical cameras (205) based on the actions of the first user (225), the direction of view of the first user (225), the location of devices held by the first user (225) among other considerations.

Eventually, generated (415) virtual images may be compiled with real-life images thereby providing an augmented reality-type view via the physical camera (205). In order to accomplish this, the physical camera (205) may capture information that may assist with segmenting (425) out portions of the image corresponding to the first user's (225) body and/or physical devices held by the user (i.e., a foreground) and background images. Depth information may be retrieved using, for example, stereo, structured light, and/or time-of-flight techniques in order to parse out the foreground images from the background images. In an example, a three-dimensional (3D) representation of the visible portions of the first user (225) could be generated. In an example, two-dimensional (2D) imaging can be used instead of 3D imaging. In an example, no segmentation is done and instead a picture-in-picture view may be provided; one picture at least providing the real-life imagery captured by the physical camera (205). In an example, again no segmentation is done, and a semi-transparent version of the real-life imagery is superimposed on top of the virtual imagery.

The method (400) may continue with compositing (430) the virtual images and segmented real-life images. Composition may include the picture-in-picture method as described herein. Alternatively, the composition (430) process may include rendering a background portion of the segmented camera view transparent and alpha-blending the segmented camera image (i.e., images of the user (225)) onto the images. In some examples, the view of the enhanced reality manipulation devices (235) may be omitted, as, when overlaid on the images the enhanced reality manipulation devices (235) may obscure the user's actions in the image. Alternatively, if the body parts of the first user (225) and/or the enhanced reality manipulation devices (235) are segmented separately from the user's (225) body parts, they could be composited in with some level of transparency, so as not to completely occlude elements in the image.

In examples where augmented reality features are implemented in the image, augmented reality (AR) content may be alpha blended with the background portion of the image, and then the foreground portion of the physical camera (205) view is composited on top of that. Some examples may take advantage of depth information both from the AR scene and the physical camera (205) view to more accurately combine the contents. Additionally, similar techniques as described herein such as rendering the view of the enhanced reality manipulation devices (235) as partially transparent may also be used.

After forming the composited (430) images, the composited imaged may be displayed (435). The composited (430) images are presented on the display device (115) as described herein on behalf of the second user.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (105) of the enhanced reality system (100) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe stabilizing enhanced reality images originating from a camera associated with an enhanced reality system. The stabilization of the images provides for a relatively better quality of experience by those persons who are viewing the virtual environment on a display device apart from that seen through, for example, an enhanced reality headset. Additionally, the use of a physical cameras and/or virtual cameras provides for different types of images to the presented at the display device. Additionally, a second user may control the view direction of either of the virtual camera or physical camera allowing for relatively more user interaction at the display device.

The preceding description has been presented to illustrate and describe examples of the principles described. This description is not intended to be exhaustive or to limit these principles to any precise form disclosed. Many modifications and variations are possible in light of the above teaching.

What is claimed is:

1. An enhanced reality system, comprising:
a processor to stabilize images of an enhanced reality environment by smoothing out a trajectory of a camera that provides a view of the enhanced reality environment;
an enhanced reality display to present, via execution of the processor, the view of the enhanced reality environment to a first user; and
a display device to present to at least a second user, via execution of the processor, a stabilized tracked view of the enhanced reality environment presented to the first user;
wherein the view of the enhanced environment provided by the display device is provided using the camera.

2. The enhanced reality system of claim 1, wherein the camera is a virtual camera virtually coupled to the first user's body to present a view over the first user's shoulder.

3. The enhanced reality system of claim 2, wherein the virtual camera is co-located with a physical camera.

4. The enhanced reality system of claim 3, wherein an image provided on the display device comprises a composition of images of a physical world and images of the virtual world as experienced by the first user.

5. The enhanced reality system of claim 4, wherein images of the physical world comprise the first user's hands, the first user's arms, objects held by the first user, or combinations thereof.

6. The enhanced reality system of claim 1, further comprising a stabilization module that, when executed by the processor, stabilizes the view presented on the display device.

7. A method comprising:
with a processor, tracking a physical location and orientation of an enhanced reality headset worn by a first user, the enhanced reality headset presenting a first view of a location within an enhanced reality environment;
with the processor, setting a location and direction within the enhanced reality environment describing a location and direction of a camera, the camera to present a second view of the location and direction within the enhanced reality environment which second view is a recalculation of the first view based on the location and direction of the camera;
with the processor, stabilizing the second view to be presented by the camera; and
providing the stabilized second view to a display device.

8. The method of claim 7, further comprising determining a direction in which the virtual camera is to point.

9. The method of claim 8, further comprising receiving input from an input device indicating the direction in which the virtual camera is to point.

10. The method of claim 9, wherein the input device is a mouse, a joystick, a motion controller, or combinations thereof.

11. The method of claim 7, wherein stabilizing the second view to be presented by the camera comprises adjusting a pitch, yaw, roll effect of the camera or combinations thereof.

12. The method of claim 7, wherein data defining the image to be presented by the camera is sent to a computing device separate from the enhanced reality headset for stabilization and display on the display device.

13. A computer program product for viewing an enhanced reality experience the computer program product comprising:
a non-transitory computer readable storage medium comprising computer usable program code embodied therewith, the computer usable program code to, when executed by a processor:
track a physical location and orientation of an enhanced reality headset worn by a first user, the enhanced reality headset presenting a first view of a location within an enhanced reality environment;
set a location within the enhanced reality environment describing a location of a camera, the camera to capture a second view of the location-within the enhanced reality environment that has a different point of view as compared to the first view and is determined by recalculating the first view based on the location and direction of the camera;
stabilize the second view; and
provide the stabilized second view to a display device.

14. The computer program product of claim 13, further comprising receiving input describing a view direction of the camera.

15. The computer program product of claim 14, wherein receiving input describing a view direction of the camera comprises slaving a view direction of the camera to the enhanced reality headset.

16. The enhanced reality system of claim 1, wherein the camera is a physical camera disposed over a shoulder of the first user.

17. The enhanced reality system of claim 16, wherein the physical camera is coupled to a backpack worn by the first user.

18. The enhanced reality system of claim 1, wherein a view from the camera is offset from a view presented by the enhanced reality display.

19. The enhanced reality system of claim 1, wherein the processor is to receive input indicating a location within the enhanced reality environment where the camera is to be placed.

20. The enhanced reality system of claim 1, wherein the camera captures a view of the enhanced reality environment with a wider point of view as compared to the view of the enhanced reality environment presented by the enhanced reality display.

\* \* \* \* \*